US012768538B2

(12) United States Patent
Ledwith, Jr. et al.

(10) Patent No.: US 12,768,538 B2

(45) Date of Patent: Oct. 20, 2026

(54) HYDROGEN LIQUID OXYGEN COMBINED CYCLE ENGINE

(71) Applicant: RTX CORPORATION, Farmington, CT (US)

(72) Inventors: Walter A. Ledwith, Jr., Marlborough, CT (US); David Lei Ma, Avon, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 19/076,381

(22) Filed: Mar. 11, 2025

(65) Prior Publication Data

US 2025/0271142 A1 Aug. 28, 2025

Related U.S. Application Data

(63) Continuation of application No. 18/342,016, filed on Jun. 27, 2023, now Pat. No. 12,259,134.

(51) Int. Cl.

*F01D 15/10* (2006.01)

*F02C 7/22* (2006.01)

(Continued)

(52) U.S. Cl.

CPC ................ *F23R 3/28* (2013.01); *F01D 15/10* (2013.01); *F02C 7/22* (2013.01); *F02C 9/18* (2013.01); *F05D 2220/36* (2013.01)

(58) Field of Classification Search

CPC ...... F23R 3/28; F02C 1/02; F02C 7/22; F02C 7/224; F02C 7/236; F02C 9/18; F02C 9/44; F05D 2220/34; F05D 2220/36; F02K 5/00; F02K 7/16; F02K 7/18; F02K 9/78; B64D 27/33

See application file for complete search history.

(56) References Cited

U.S. PATENT DOCUMENTS 2,716,329 A * 8/1955 Lunger .................. F02C 7/224 60/39.461

3,237,400 A * 3/1966 Kuhrt ..................... F02C 7/224 60/260

(Continued)

FOREIGN PATENT DOCUMENTS

DE 1043721 B * 11/1958

*Primary Examiner* — Devon C Kramer

*Assistant Examiner* — Sean V Meiller

(74) *Attorney, Agent, or Firm* — Carlson, Gaskey & Olds, P.C.

(57) ABSTRACT

A propulsion system for an air vehicle includes a fan system that includes a fan that is coupled to a fan drive electric motor for generating a fan discharge airflow, an augmentor where fuel is mixed with a portion of the fan discharge airflow to generate a propulsive flow in a first operating configuration, a bypass duct for directing the fan discharge airflow into the augmentor, a duct blocker for selectively closing the bypass duct to the fan discharge airflow, a liquid oxygen system that is configured to inject liquid oxygen into the augmentor to mix with the fuel when the fan discharge airflow is closed by the duct blocker, the mixture of fuel flow and liquid oxygen generates the propulsive flow in a second operating configuration, and an electric power generation system is coupled to drive the fan drive electric motor.

20 Claims, 3 Drawing Sheets

(51) Int. Cl.
*F02C 9/18* (2006.01)
*F23R 3/28* (2006.01)

(56) References Cited

U.S. PATENT DOCUMENTS

| | | | | | |
|---|---|---|---|---|---|
| 5,052,176 | A * | 10/1991 | Labatut | F23R 3/20 60/761 |
| 5,159,809 | A * | 11/1992 | Ciais | F02K 7/18 60/225 |
| 6,058,846 | A * | 5/2000 | Boyd | F02K 7/18 60/245 |
| 9,447,734 | B2 * | 9/2016 | Mariotto | B64D 35/024 |
| 11,530,617 | B2 * | 12/2022 | O'Neill | F02C 7/06 |
| 2009/0113873 | A1 * | 5/2009 | Tweeton | F02K 7/18 60/246 |

* cited by examiner

HYDROGEN LIQUID OXYGEN COMBINED CYCLE ENGINE

CROSS-REFERENCE TO RELATED APPLICATION

This application is a Continuation of U.S. application Ser. No. 18/342,016 filed Jun. 27, 2023.

TECHNICAL FIELD

The present disclosure relates generally to a combined cycle engine for use as in a single stage or two stage to orbit vehicle.

BACKGROUND

Propulsion systems that can carry a vehicle to orbit typically include multiple stages of rocket engines. A single stage or even a two-stage propulsion system may provide significant benefits. However, vehicle weight, drag, and velocity requirements impose significant challenges to thrust and propellant requirements which must be overcome to enable application of such a propulsion system.

Propulsion system manufacturers continually seek more efficient, powerful and cost effective propulsion systems to meet ever increasing performance and efficiency demands.

SUMMARY

A propulsion system for an air vehicle according to an exemplary embodiment of this disclosure, among other possible things includes a fan system that includes a fan that is coupled to a fan drive electric motor for generating a fan discharge airflow, an augmentor where fuel is mixed with a portion of the fan discharge airflow to generate a propulsive flow in a first operating configuration, a bypass duct for directing the fan discharge airflow into the augmentor, a duct blocker for selectively closing the bypass duct to the fan discharge airflow, a liquid oxygen system that is configured to inject liquid oxygen into the augmentor to mix with the fuel when the fan discharge airflow is closed by the duct blocker, the mixture of fuel flow and liquid oxygen generates the propulsive flow in a second operating configuration, and an electric power generation system is coupled to drive the fan drive electric motor.

In a further embodiment of the foregoing, the propulsion system further includes a translating inlet that is movable between an open position that allows inlet airflow to the fan system and a closed position that shuts inlet airflow to the fan system.

In a further embodiment of any of the foregoing propulsion systems, the electricity generation system includes a generator that is coupled to a free turbine driven by an exhaust gas flow.

In a further embodiment of any of the foregoing propulsion systems, the exhaust gas flow is generated by a mixture of fuel and liquid oxygen in a combustor that expands through the free turbine and is exhausted through a nozzle.

In a further embodiment of any of the foregoing, the propulsion system includes a fuel pump for pressurizing a fuel flow to the combustor and an oxidizer pump for pressurizing a liquid oxygen flow to the combustor.

In a further embodiment of any of the foregoing propulsion systems, the fuel pump includes a fuel turbopump and the oxidizer pump includes an oxidizer turbopump. Both the fuel turbopump and the oxidizer turbopump are configured to be driven by a hot gas flow that is generated by combustion of a mixture of fuel and oxidizer.

In a further embodiment of any of the foregoing propulsion systems, the fuel pump is driven by a first electric motor and the oxidizer pump is driven by a second electric motor.

In a further embodiment of any of the foregoing, the propulsion system includes a gearbox that is driven by the free turbine and includes an output that is coupled to drive the generator.

In a further embodiment of any of the foregoing propulsion systems, the propulsive flow is expelled through a converging diverging nozzle.

In a further embodiment of any of the foregoing propulsion systems, in the first operating configuration, the fan generates a fan discharge flow through the augmenter and in the second operating configuration, the translating inlet is closed and the propulsive flow is generated by combustion of a mixture of fuel and liquid oxygen in the augmentor.

In a further embodiment of any of the foregoing propulsion systems, the fan of the fan system includes a multi-stage fan.

An aircraft propulsion system according to another exemplary embodiment of this disclosure, among other possible things includes a fan system that includes a fan that is coupled to a fan drive electric motor that is configured to generate a fan discharge flow, a translating inlet that is movable between an open position that allows inlet airflow to the fan system and a closed position closes off inlet airflow to the fan system, a fuel system provides a flow of fuel, an augmentor that is configured to generate a propulsive gas flow from a mixture of fuel and the fan discharge airflow in a first engine operating configuration, a duct blocker that is movable between an open and a closed position for controlling the fan discharge flow to the augmentor, and a liquid oxygen system that is configured to provide oxygen to the augmentor to mix with the fuel and generate the propulsive gas flow in a second engine operating configuration. In the second engine operating configuration, the duct blocker is in a closed position such that no fan discharge flow is communicated to the augmentor. An electric power generation system has a generator that is coupled to a free turbine section. The free turbine is driven by an exhaust gas flow that is generated by a mixture of fuel and liquid oxygen.

In a further embodiment of the foregoing aircraft propulsion system, the electricity generating system includes a combustor where the fuel and liquid oxygen are mixed and ignited to generate the exhaust gas flow, a fuel pump for pressurizing a fuel flow is communicated to the combustor and an oxidizer pump for pressurizing a liquid oxygen flow to the combustor.

In a further embodiment of any of the foregoing aircraft propulsion systems, the fuel pump includes a fuel turbopump and the oxidizer pump includes an oxidizer turbopump. Each of the fuel turbopump and the oxidizer turbopump are driven by a hot gas flow.

In a further embodiment of any of the foregoing aircraft propulsion systems, the fan of the fan system includes a multi-stage fan.

A method of operating an aircraft propulsion system according to another exemplary embodiment of this disclosure, among other possible things includes generating electric power with a free turbine driven generator, driving a fan with an electric motor to generate a fan discharge flow, the electric motor is driven by the generated electric power from the generator, mixing the fan discharge airflow with fuel in an augmentor to generate a propulsive gas flow that is exhausted through a nozzle in a first engine operating configuration, and closing off the fan discharge airflow to the augmentor and communicating an oxygen flow to the augmentor for mixing with the fuel to generate the propulsive gas flow that is exhausted through the nozzle in a second engine operating configuration.

In a further embodiment of the foregoing method, generating electric power includes generating an exhaust gas flow from a flow of oxygen and fuel that is ignited in a combustor for driving the free turbine in an electricity generation system separate from the fan.

In a further embodiment of any of the foregoing, the method further includes controlling inlet flow to the fan with a translating inlet. The translating inlet is open in the first engine operating configuration and closed in the second engine operating configuration.

In a further embodiment of any of the foregoing, the method further includes operating in the first engine operating configuration for a first set of flight conditions and operating in the second engine operating configuration for a second set of flight conditions and transitioning between the first engine operating configuration to the second engine operating configuration by closing fan discharge airflow to the augmentor and communicating a liquid oxygen flow to the augmentor.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
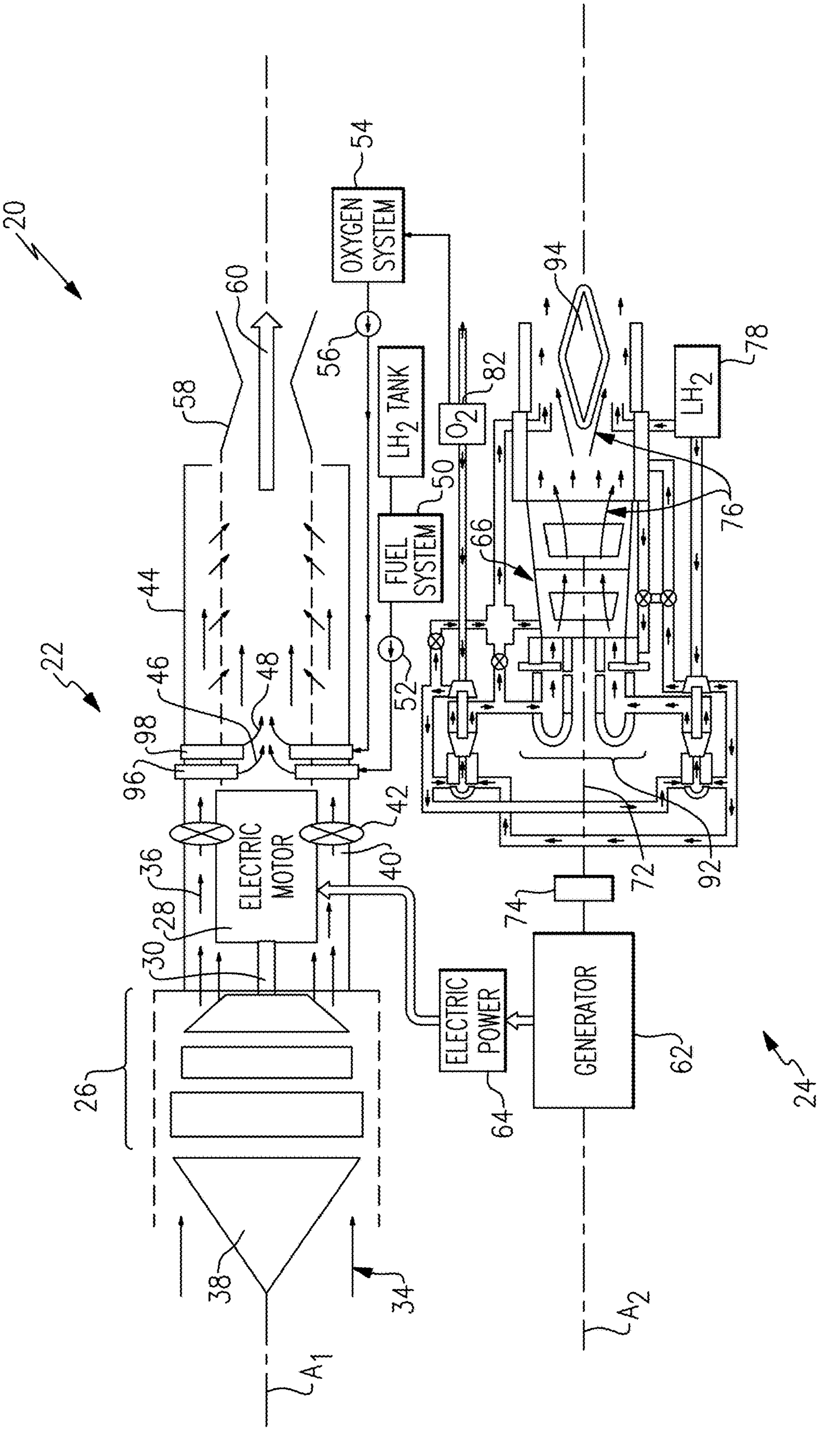
FIG. 1 is a schematic view of an example combined cycle aircraft propulsion system embodiment.

FIG. 1 schematically illustrates an example propulsion system 20 for use as a single stage or two stage to orbit aircraft or vehicle. The example propulsion system 20 uses electric power 64 generated by a power generation system 24 to drive an electric motor powered fan section 26 of a combined cycle engine 22. A fan discharge flow 36 from the fan is communicated into an augmentor 44, mixed with fuel 46 and ignited to generate a propulsive gas flow 60 when operating in a first engine operating configuration. In a second engine operating configuration, the fan section 26 is turned off and fan discharge air replaced with a liquid oxygen flow 48 mixed with the fuel 46 to generate the propulsive flow 60. Accordingly, the combined cycle engine 22 transitions from utilizing the fan section 26 to produce the propulsive thrust to operation as a rocket engine.

The propulsion system 20 includes the combined cycle engine 22 disposed along an engine axis A1 and the power generation system 24 that is disposed along a secondary axis A2. The example combined cycle engine 22 includes a liquid hydrogen fuel system 50 that provides a liquid hydrogen fuel flow 46 to injectors 96 disposed within the augmentor 44. A pump 52 provides the flow of liquid hydrogen fuel 46 to injectors 96. A liquid oxygen system 54 including an oxygen pump 56 provides liquid oxygen to oxygen injectors 98 for operation in the second engine operating configuration.

The example fan section 26 includes a multi-stage fan 32 that compresses inlet airflow 34 through a translating inlet 38. The multi-stage fan 32 is driven through a shaft 30 coupled to an electric motor 28. Fan discharge air 36 is communicated through a bypass duct 40 into the augmentor 44. Duct blockers 42 are provided to control fan discharge airflow 36 communication into the augmentor 44.

Electric power 64 to drive the electric motor 28 along with other electric accessory items, pumps and/or actuators is provided by the electric power generation system 24. The electric power generation system 24 is located along a second axis A2 that is set apart from the first axis A1. Although the example power generation system 24 is shown arranged proximate to the combined cycle engine 22, the power generation system 24 may be mounted separate from the combined cycle engine 22 within the aircraft, vehicle fuselage or other structures.

The example electric power generation system 24 is a hydrolox powerplant that burns a mixture of liquid hydrogen ($LH_2$) and liquid oxygen (LOX). Combusting the hydrogen with the oxygen within the hydrolox powerplant eliminates nitrous oxide emissions and enables generation of electric power independent of oxygen content in an operational environment.

The electric power generation system 24 generates an exhaust gas flow 76 that is expanded through a free turbine section 66 to drive a shaft 72. The shaft 72 drives the generator 62 through a gearbox 74. The example electric power generation system 24 utilizes liquid hydrogen ($LH_2$) fuel and liquid oxygen (LOX) oxidizer that are mixed in a combustor 92 to generate the exhaust gas flow 76 that expands through the free turbine section 66 and out through a nozzle 94.

The fuel system 50 for the combined cycle engine 22 may draw fuel flow 46 from a liquid hydrogen tank 78 that also supplies fuel flow to the power generation system 24. Although hydrogen and oxygen are disclosed by way of example, other fuels and fuel combinations could be utilized and are within the contemplation of this disclosure. For example, kerosene-oxygen, methane-oxygen, Aerozine 50 (hydrazine)-nitrogen tetra-oxide, and any other known rocket engine propellant. The oxygen system 54 of the combined cycle engine 22 may draw the oxygen flow 48 from a liquid oxygen tank 82 that also supplies the power generation system 24. The example oxygen system 54 may provide oxygen in a liquid form, or may provide an oxygen enhanced flow from separating oxygen from an inlet airflow. Other oxidizers may also be used within the contemplation and scope of this disclosure.

Figure 2A:
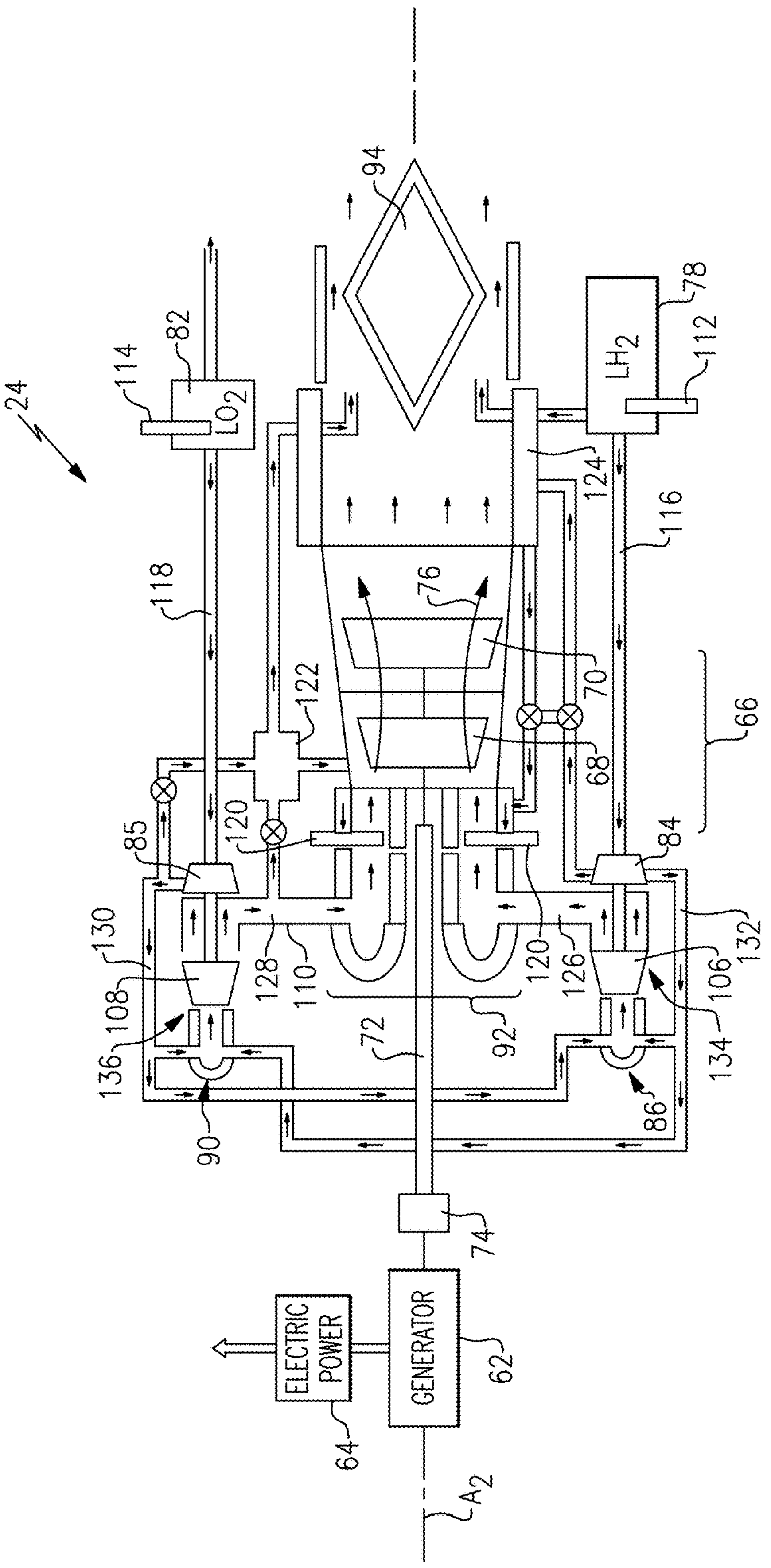
FIG. 2A is a schematic view of the power generation section of the combined cycle engine of FIG. 1.

Referring to FIG. 2A with continued reference to FIG. 1, the power generation system 24 uses a hot gas flow generated by combustion of the fuel and oxidizer to drive a fuel turbopump 134 and an oxidizer turbopump 136. The fuel turbopump 134 includes a turbine 106 driving a fuel pump 84. The oxidizer turbopump 136 includes a turbine 108 that drives an oxidizer pump 85. The fuel turbopump 134 and the oxidizer turbopump 136 are driven by a gas flow generated by pre-burners 86, 90. The pre-burners 86, 90 run oxygen rich so that any resulting exhaust will be cool. Liquid hydrogen is discharged from the fuel pump 84 into passage 132 in communication with the pre-burner 90. Liquid oxygen is discharged into passage 130 and communicated to the pre-burner 86. The discharge flows are mixed to provide a fuel and oxygen mixture needed in each of the pre-burners 86, 90.

Figure 2B:
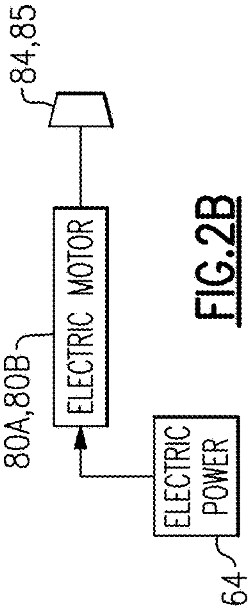
FIG. 2B is a schematic view of an example electric motor driven fuel and oxidizer pump embodiment.

Referring to FIG. 2B, although the turbopumps are disclosed by way of example, the fuel pump 84 and oxidizer pump 85 may be driven by a corresponding electric motor indicated schematically at 80A and 80B.

Referring back to FIG. 2A, the pre-burners 86, 90 communicate exhaust gases into a manifold 110 that is in communication with the combustor 92. An oxygen flow 128 and a hydrogen flow 126 are also communicated to the combustor 92 through the hot gas manifold 110 and burnt. Injectors 120 at the end of the manifold 110 inject additional hydrogen fuel into the oxygen rich combusted gases generated in the combustor 92. The injectors 120 may be spray bars that inject liquid hydrogen into the gas stream from the combustor 92 to increase the temperature of the exhaust gas flow 76.

The exhaust gas flow 76 expands through the free turbine section 66 and then exhausted through a nozzle 94 to an ambient environment. The exhaust gas flow 76 expands through the multi-stage free turbine section 66 to generate a mechanical power output utilized to drive the generator 62. The example free turbine section 66 includes a first turbine 68 and a second turbine 70 that are both coupled to drive the shaft 72. Although the example free turbine section 66 is shown by example as including first and second turbines 68, 70, other numbers of turbines may be utilized and are within the contemplation of this disclosure.

The free turbine section 68 may be cooled by a flow of a gaseous oxygen flow through turbine cooling passages exiting from the oxygen cooling flow heat exchanger 122. This heat exchange obtains liquid oxygen from 130 and then heats it with a bleed of hot gas from manifold 110. Excess cooling oxygen flow may be exhausted through the nozzle 94. The nozzle 94 may be fixed or variable to enhance engine operation. The exhaust gas flow 76 exhausted from the electric power generation system 24 supplements the primary propulsive flow 60 generated in the combined cycle engine 22.

An alternate configuration of the example power generation system could delete the combustor 92, turbine cooling features, and the oxygen turbine cooling flow heat exchanger 122. The alternate configuration would be uncooled and may also change the pre-burner gas flow to be hydrogen rich to address application specific operation.

A recuperator 124 may be provided to pre-heat the liquid hydrogen fuel flow with heat from the exhaust gas flow 76. The amount of hydrogen fuel can be controlled by a valve. The preheated liquid hydrogen fuel flow may be communicated to the injectors 120 aft of the combustor 92. The oxygen tank 82 may include tank pressurization heater 114. The liquid hydrogen tank 78 may also include a tank pressurization heater 112. Liquid hydrogen is communicated through fuel line 116 to the turbopump 134. Liquid oxygen is provided through the oxygen line 118.

To control pressure levels, the oxygen tank 82 has a valve to vent to the atmosphere. A similar mechanism on the hydrogen tank 78 vents back into the engine flow path upstream of the nozzle 58.

Although the power generation system 24 is shown by way of example as providing the electric power to drive the electric motor 28 of the combined cycle engine 22, other electric generation or supply systems may also be utilized and are within the contemplation of this disclosure.

Figure 3:
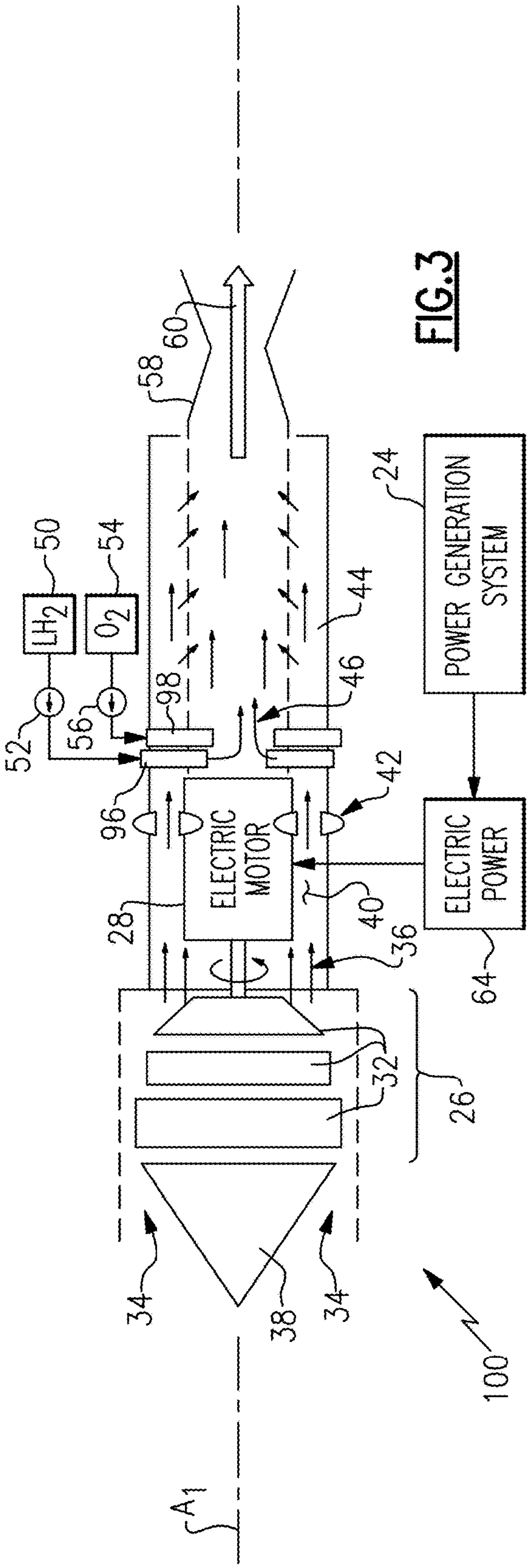
FIG. 3 is a schematic view of the combined cycle engine of FIG. 1 shown in a first engine operating configuration.

Referring to FIG. 3 with continued reference to FIG. 1, the combined cycle engine 22 is shown in a first engine operating configuration 100. In the first engine operating configuration, the translating inlet 38 is in an open position where inlet airflow 34 is communicated to the fan section 26. The inlet airflow 34 is pressurized through the multiple stages 32 of the fan section 26 into the bypass duct 40. The duct blocker 42 is open to enable the fan discharge flow 36 into the augmentor 44. Although the translating inlet 38 is shown and described by way of example, other inlet control and shutoff devices may also be utilized and are within the scope and contemplation of this disclosure.

The liquid hydrogen fuel system 50 provides the fuel flow 46 that mixes with the fan air discharge flow 36 and burned to generate the propulsive gas flow 60. The oxygen system 54 is in an off condition as oxygen from the fan air discharge flow is utilized to support combustion and generate the propulsive gas flow 60. Operation in the first engine operating configuration 100 requires an inlet airflow with sufficient oxygen content to support combustion. Moreover, with increasing speeds, the ability of the fan section 26 to generate the required fan discharge flows needed decreases. Accordingly, as speeds increase, the combined cycle engine 22 is transitioned into operation as a rocket engine.

Figure 4:
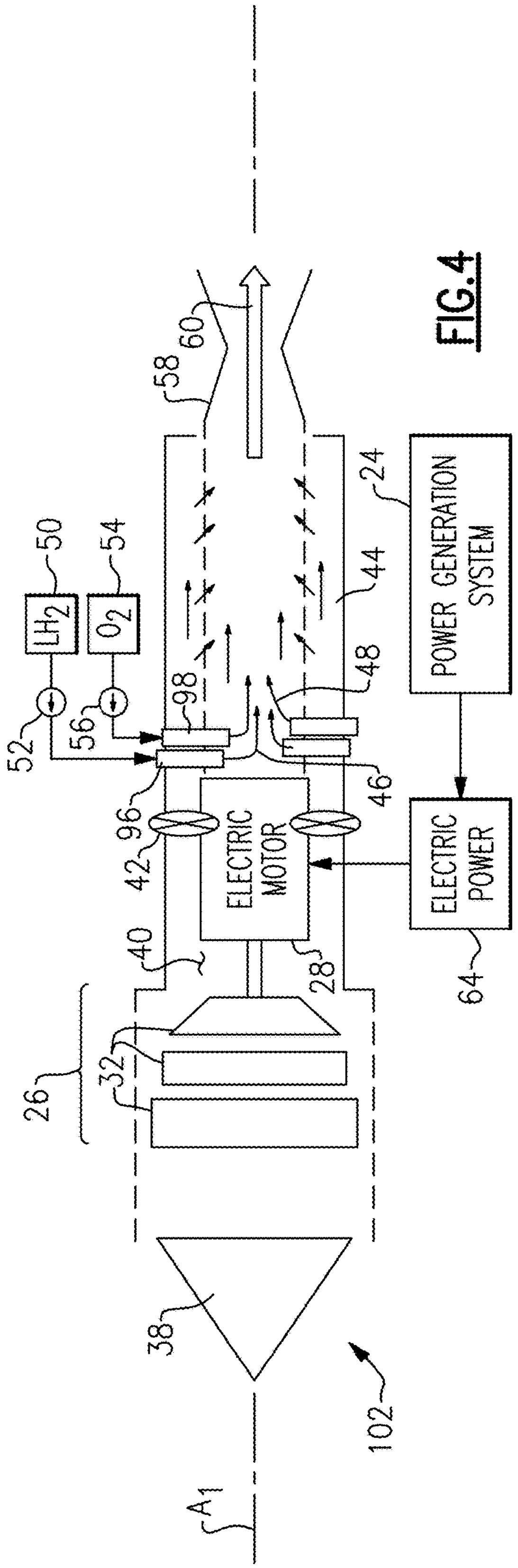
FIG. 4 is a schematic view of the combined cycle engine of FIG. 1 shown in a second engine operating configuration.

Referring to FIG. 4, the example combined cycle engine 22 is shown in a second engine operating configuration 102. In the second engine operating configuration 102, the translating inlet 38 is in an off position that prevents inlet airflow into the fan section 26. The fan section 26 is turned off and the duct blocker 42 is closed such that no fan discharge air is communicated to the augmentor 44. The oxygen system 54 is turned on to provides an oxygen flow 48 that is mixed with the fuel flow 46 and burned to generate the propulsive flow 60. The example oxygen flow 48 may be liquid oxygen or an oxygen enriched flow that provides the oxidant required for combustion. The propulsive flow 60 is exhausted through a nozzle 58 to provide the desired thrust. The example nozzle 58 is a converging diverging nozzle. Other fixed and variable nozzle configurations could be utilized and are within the contemplation of this disclosure.

Referring to FIGS. 3 and 4, an example operational embodiment of the propulsion system 20 is initiated with the combined cycle engine 22 arranged according to the first engine operating configuration shown in FIG. 3. In the first engine operating configuration 100, the translating inlet 38 is in an open position to allow inlet airflow into the fan section 26. The duct blocker 42 is open to allow the fan discharge airflow 36 into the augmentor 44. Electric power 64 from the power generation system 24 is provided to drive the fan section 26. The fan section 26 drives fan discharge airflow 36 into the augmentor 44 where it is mixed with liquid hydrogen fuel 46 and burned to generate the propulsive flow 60. The flow of liquid oxygen is turned off as the fan discharge flow 36 provides sufficient oxygen for combustion. The combined cycle engine 22 operates in the first engine operating configuration 100 through takeoff and climb to altitude as the aircraft accelerates to higher supersonic speeds.

As speeds increase, the translating inlet 38 may be adjusted to condition and control the inlet airflow 34. Power to the fan section 26 is reduced as the translating inlet 38 and flow provides sufficient compression of inlet airflow similar to ram jet operation. At a desired speed and/or defined operating condition, the translating inlet 38 closes inlet airflow and the fan section 26 is shut off.

Once inlet airflow 34 is shut off, the combined cycle engine 22 transitions to operation in the second engine operating configuration 102 as shown in FIG. 4. The inlet airflow 34 is turned off and the duct blocker 42 is closed such that no outside airflow is provided to the augmentor 44. The liquid oxygen flow 48 is turned on and mixed with the liquid fuel flow 46 generate the propulsive flow 60. In the second engine operating configuration 102, the combined cycle engine 22 is operating as a rocket engine to increase thrust and speeds. The combined cycle engine 22 may operate at a maximum thrust until transitioned back to the first engine operating configuration 100.

Alternatively, the combined cycle engine 22 may be configured with multiple stages to further increase thrust capacity. The combined cycle engine 22 may be ejected as a first stage and the aircraft transitioned to a subsequent stage configured to provide an increase in thrust for further operation of the aircraft or vehicle.

Accordingly, the example propulsion system utilizes an electrically driven fan to smooth transition of the combined cycle engine from lower Mach number jet engine thrust levels to higher Mach number rocket engine thrust levels.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an air vehicle comprising:
- a fan system comprising a fan coupled to a fan drive electric motor for generating a fan discharge airflow;
- an inlet movable between an open position allowing inlet airflow to the fan system and a closed position shutting inlet airflow to the fan system;
- an augmentor where fuel is mixed with a portion of the fan discharge airflow to generate a propulsive flow in a first operating configuration;
- a bypass duct for directing the fan discharge airflow into the augmentor;
- a duct blocker for selectively closing the bypass duct to the fan discharge airflow;
- a liquid oxygen system configured to inject liquid oxygen into the augmentor to mix with the fuel when the fan discharge airflow is closed by the duct blocker, wherein the mixture of fuel flow and liquid oxygen generates the propulsive flow in a second operating configuration; and
- an electric power generation system comprising a combustor where exhaust gas flows are mixed with fuel and liquid oxygen to generate an exhaust gas flow that is expanded through a free turbine, wherein the free turbine is coupled to drive a generator that provides electric power to the fan drive electric motor to drive the fan drive electric motor, wherein the fan drive electric motor is de-energized in the second operating configuration and wherein the exhaust gas flow from the electric power generation system is exhausted through a nozzle to supplement the propulsive flow.

2. The propulsion system as recited in claim 1, wherein the inlet translates axially between the open position and the closed position.

3. The propulsion system as recited in claim 1, including a fuel pump for pressurizing a fuel flow to the combustor and an oxidizer pump for pressurizing a liquid oxygen flow to the combustor.

4. The propulsion system as recited in claim 3, wherein the fuel pump comprises a fuel turbopump and the oxidizer pump comprises an oxidizer turbopump, both the fuel turbopump and the oxidizer turbopump are configured to be driven by a hot gas flow generated by combustion of a mixture of fuel and oxidizer.

5. The propulsion system as recited in claim 3, wherein the fuel pump is driven by a first electric motor, and the oxidizer pump is driven by a second electric motor.

6. The propulsion system as recited in claim 1, including a gearbox driven by the free turbine and including an output coupled to drive the generator.

7. The propulsion system as recited in claim 1, wherein the nozzle is a converging diverging nozzle.

8. The propulsion system as recited in claim 1, wherein the propulsion system is configured to operate in the first operating configuration where the fan generates the fan discharge flow through the augmenter and in the second operating configuration where the inlet is closed and the propulsive flow is generated by combustion of the mixture of fuel and liquid oxygen in the augmentor.

9. The propulsion system as recited in claim 1, wherein the fan of the fan system comprises a multi-stage fan.

10. The propulsion system as recited in claim 1, wherein the fuel comprises a liquid hydrogen fuel.

11. The propulsion system as recited in claim 1, wherein a propellant communicated to the combustor comprises at least one of a combination of kerosene-oxygen, methane-oxygen, and Aerozine 50 (hydrazine)-nitrogen tetra-oxide.

12. The propulsion system as recited in claim 1, wherein the fan system is disposed along an engine axis, and the electric power generation system is disposed along a secondary axis that is different than the engine axis.

13. An aircraft propulsion system comprising: a fan system including a fan rotatable about an engine axis and coupled to a fan drive electric motor configured to generate a fan discharge flow; an inlet movable between an open position allowing inlet airflow to the fan system and a closed position closing off inlet airflow to the fan system; a fuel system providing a flow of fuel; an augmentor configured to generate a propulsive gas flow from a mixture of fuel and the fan discharge airflow in a first engine operating configuration; a duct blocker movable between an open and a closed position for controlling the fan discharge flow to the augmentor; and a liquid oxygen system configured to provide oxygen to the augmentor to mix with the fuel and generate the propulsive gas flow in a second engine operating configuration, wherein in the second engine operating configuration, the duct blocker is in a closed position such that no fan discharge flow is communicated to the augmentor; and an electric power generation system includes a combustor for generating an exhaust gas flow by igniting a mixture of fuel and liquid oxygen, a free turbine section configured to be driven by the exhaust gas flow from the combustor, and an electric generator driven by the free turbine to provide electric power to the fan drive electric motor, wherein the fan drive electric motor is de-energized in the second engine operating configuration and the exhaust gas flow is exhausted through nozzle to supplement the propulsive gas flow.

14. The aircraft propulsion system as recited in claim 13, wherein the electric power generation system further comprises a fuel pump for pressurizing a fuel flow communicated to the combustor and an oxidizer pump for pressurizing a liquid oxygen flow to the combustor.

15. The aircraft propulsion system as recited in claim 14, wherein the fuel pump comprises a fuel turbopump and the oxidizer pump comprises an oxidizer turbopump, wherein each of the fuel turbopump and the oxidizer turbopump are driven by a hot gas flow.

16. The aircraft propulsion system as recited in claim 13, wherein the fan of the fan system comprises a multi-stage fan.

17. A method of operating an aircraft propulsion system comprising:

generating electric power with a free turbine driven generator rotatable about an engine axis;

driving a fan about the engine axis with an electric motor to generate a fan discharge flow in a first engine operating configuration, wherein the electric motor is driven by the generated electric power from the generator;

mixing the fan discharge airflow with fuel in an augmentor to generate a propulsive gas flow exhausted through a nozzle in the first engine operating configuration;

closing off an inlet flow to the fan, closing off the fan discharge airflow to the augmentor, and communicating an oxygen flow to the augmentor for mixing with the fuel to generate the propulsive gas flow that is exhausted through the nozzle in a second engine operating configuration; and de-energizing the electric motor in the second engine operating configuration, wherein the electric power is generated by a power generation system that generates an exhaust gas flow that is exhausted through the nozzle to supplement the propulsive gas flow.

18. The method as recited in claim 17, wherein generating electric power comprises generating an exhaust gas flow from a flow of liquid oxygen and fuel ignited in a combustor for driving the free turbine in an electricity generation system separate from the fan.

19. The method as recited in claim 17, further comprising controlling inlet flow to the fan with a translating inlet, wherein the translating inlet is open in the first engine operating configuration and closed in the second engine operating configuration.

20. The method as recited in claim 17, further comprising operating in the first engine operating configuration for a first set of flight conditions and operating in the second engine operating configuration for a second set of flight conditions and transitioning between the first engine operating configuration to the second engine operating configuration by closing fan discharge airflow to the augmentor and communicating a liquid oxygen flow to the augmentor.

* * * * *